(12) United States Patent  (10) Patent No.: US 12,101,628 B2
Asakura  (45) Date of Patent: Sep. 24, 2024

(54) COMMUNICATION SYSTEM, NON-TRANSITORY COMPUTER-READABLE MEDIUM FOR TERMINAL, AND COMMUNICATION APPARATUS

(71) Applicant: BROTHER KOGYO KABUSHIKI KAISHA, Nagoya (JP)

(72) Inventor: Hirotaka Asakura, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 403 days.

(21) Appl. No.: 17/679,367

(22) Filed: Feb. 24, 2022

(65) Prior Publication Data

US 2022/0279346 A1  Sep. 1, 2022

(30) Foreign Application Priority Data

Feb. 26, 2021 (JP) .................................. 2021-029849

(51) Int. Cl.
*H04L 29/06* (2006.01)
*H04W 8/00* (2009.01)
(Continued)

(52) U.S. Cl.
CPC ........... *H04W 12/04* (2013.01); *H04W 8/005* (2013.01); *H04W 48/08* (2013.01); *H04W 48/16* (2013.01); *H04W 76/10* (2018.02)

(58) Field of Classification Search
None
See application file for complete search history.

(56) References Cited

U.S. PATENT DOCUMENTS 8,661,254 B1* 2/2014 Sama ...................... H04L 63/18
                                                              713/168
9,887,992 B1* 2/2018 Venkat .................... G06F 21/35
(Continued)

FOREIGN PATENT DOCUMENTS

JP  2014-116871 A  6/2014
JP  2019-013034 A  1/2019
JP  2019-029989 A  2/2019

OTHER PUBLICATIONS

Yong, Kelvin S.C. et al. A survey of the QR code phishing: the current attacks and countermeasures. 2019 7th International Conference on Smart Computing & Communications (ICSCC). https://ieeexplore.ieee.org/stamp/stamp.jsp?tp=&arnumber=8843688 (Year: 2019).*

(Continued)

*Primary Examiner* — Jeremiah L Avery
(74) *Attorney, Agent, or Firm* — Scully, Scott, Murphy & Presser, PC

(57) ABSTRACT

A technique uses a code image that is less likely to increase in size. A terminal decodes a code image to obtain a character string. The character string includes identification information to identify a communication apparatus without including a public key of the communication apparatus. The terminal obtains the public key of the communication apparatus using the identification information and performs a predetermined process to perform target communication with the communication apparatus using the obtained public key. The target communication establishes a wireless connection in accordance with a predetermined communication protocol between a pair of devices.

24 Claims, 6 Drawing Sheets

(51) Int. Cl.
*H04W 12/04* (2021.01)
*H04W 48/08* (2009.01)
*H04W 48/16* (2009.01)
*H04W 76/10* (2018.01)

(56) References Cited

U.S. PATENT DOCUMENTS

| | | | | |
|---|---|---|---|---|
| 9,985,786 | B1* | 5/2018 | Bhabbur | G06F 3/0488 |
| 10,270,587 | B1* | 4/2019 | Wu | H04L 9/3234 |
| 10,491,587 | B2* | 11/2019 | Hon | G06F 16/951 |
| 10,963,865 | B1* | 3/2021 | Rule | G06Q 20/3278 |
| 10,970,378 | B2* | 4/2021 | Bendersky | H04L 9/3263 |
| 2012/0084834 | A1* | 4/2012 | Brown | H04W 12/04 |
| | | | | 709/219 |
| 2012/0137315 | A1* | 5/2012 | Christopher | H04N 21/4126 |
| | | | | 725/5 |
| 2013/0094538 | A1* | 4/2013 | Wang | H04L 63/08 |
| | | | | 375/141 |
| 2014/0189808 | A1* | 7/2014 | Mahaffey | G06F 21/6245 |
| | | | | 726/4 |
| 2015/0282216 | A1* | 10/2015 | Reshef | H04L 63/104 |
| | | | | 455/39 |
| 2017/0078922 | A1* | 3/2017 | Raleigh | H04L 69/18 |
| 2017/0280488 | A1 | 9/2017 | Kawasaki | |
| 2019/0149539 | A1* | 5/2019 | Scruby | H04L 63/0838 |
| | | | | 713/168 |
| 2020/0045016 | A1* | 2/2020 | Chor | H04L 63/0442 |
| 2020/0154276 | A1 | 5/2020 | Minakawa | |
| 2020/0404019 | A1* | 12/2020 | Drake | H04L 9/3226 |
| 2021/0044976 | A1* | 2/2021 | Avetisov | G06F 21/64 |
| 2024/0015509 | A1* | 1/2024 | Kopka | G06K 7/1417 |

OTHER PUBLICATIONS

Saito, Takamichi et al. Security Authorization Scheme for Web Applications. 2015 18th International Conference on Network-Based Information Systems. https://ieeexplore.ieee.org/stamp/stamp.jsp?tp=&arnumber=7350628 (Year: 2015).*

Bilal, Muhammad et al. Evaluation of Secure OpenID-Based RAAA User Authentication Protocol for Preventing Specific Web Attacks in Web Apps. 020 IEEE 11th International Conference on Software Engineering and Service Science (ICSESS). https://ieeexplore.ieee.org/stamp/stamp.jsp?tp=&arnumber=9237635 (Year: 2020).*

Wi-Fi Easy Connect Specification Version 2.0, Wi-Fi Alliance, 2020.

* cited by examiner

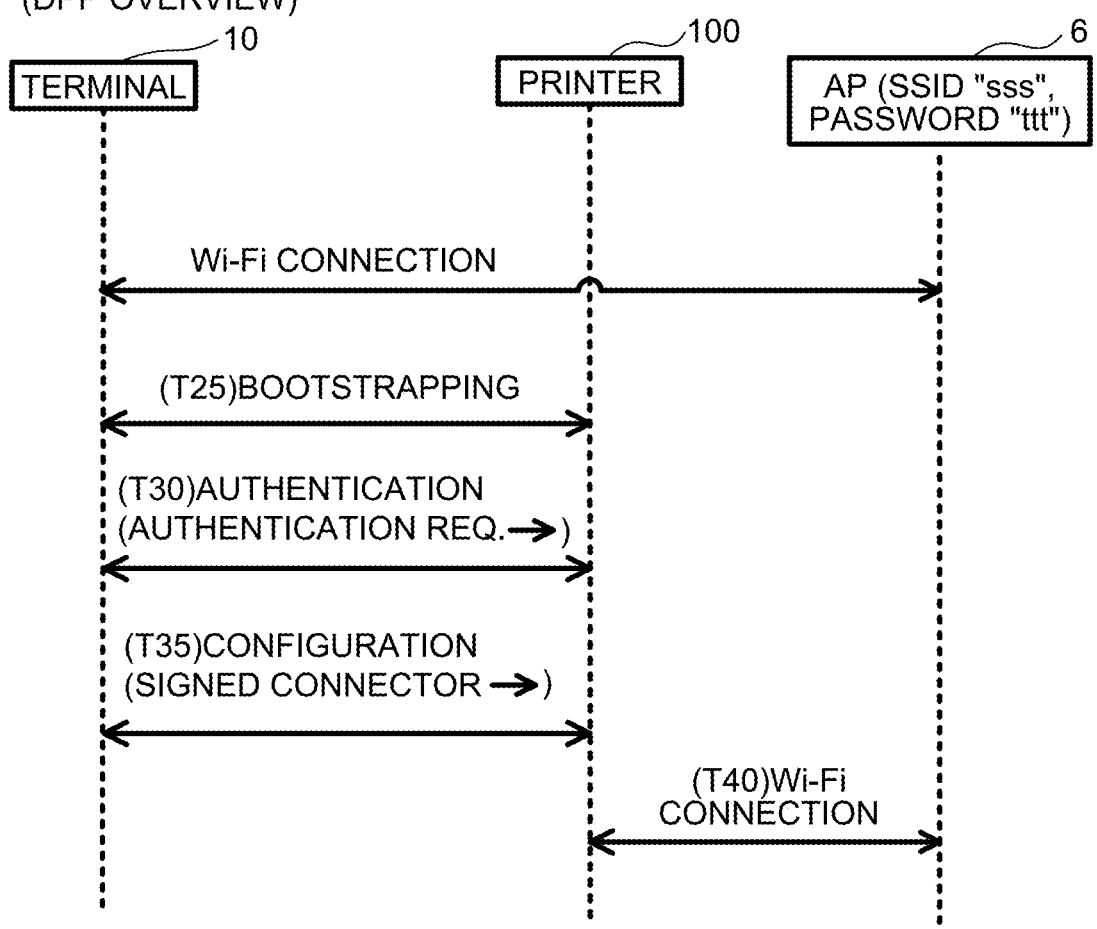

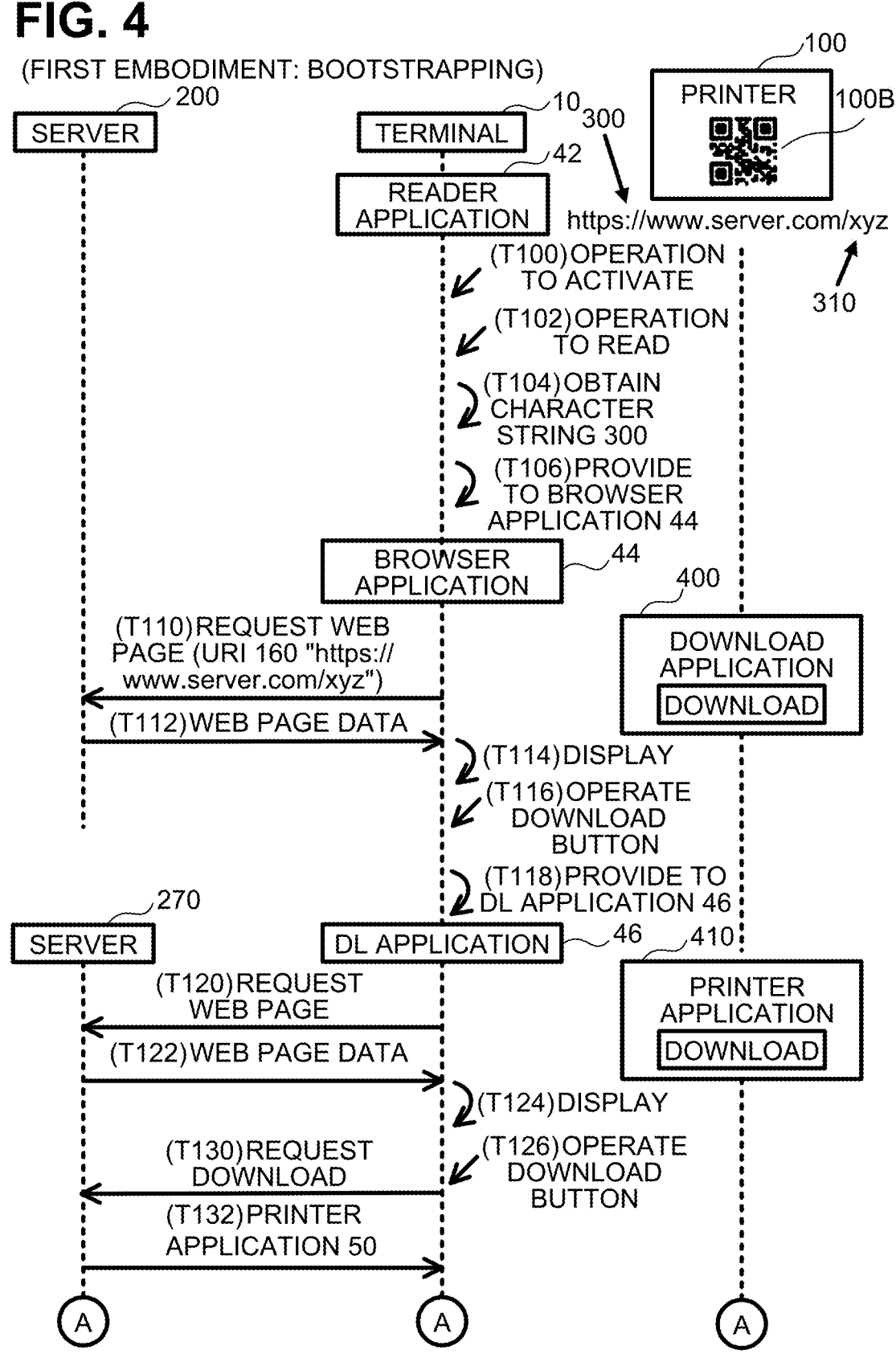

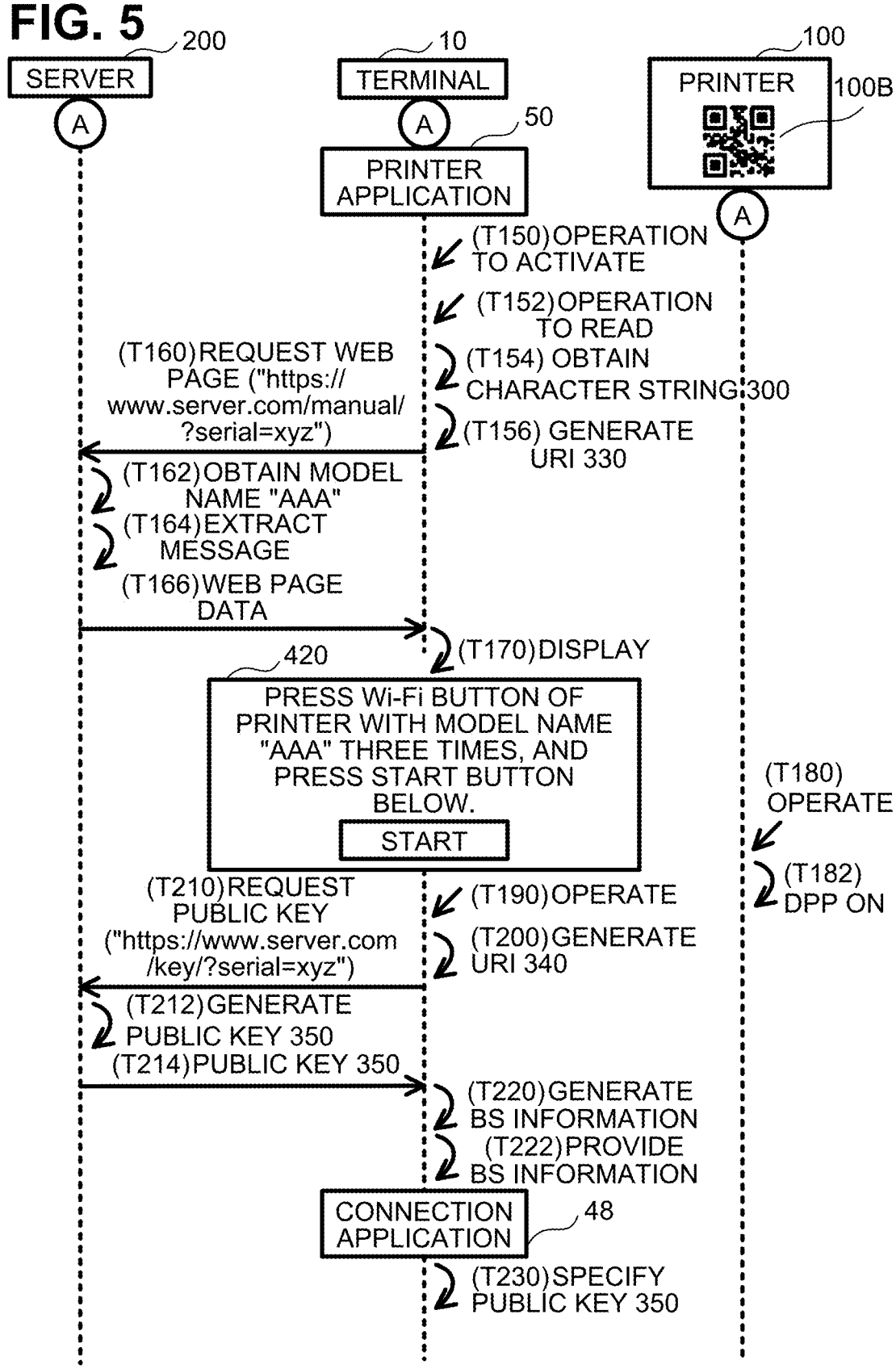

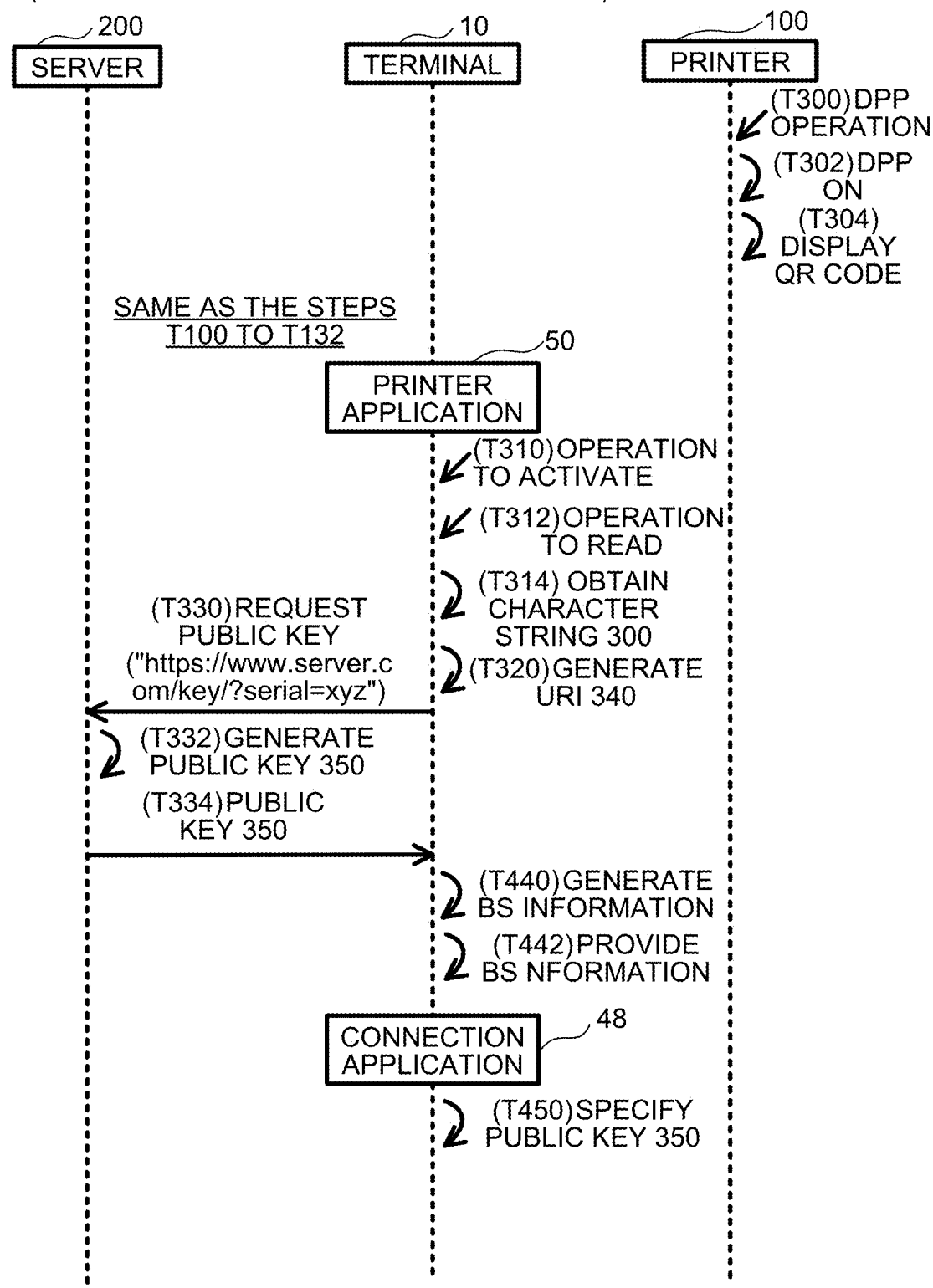

COMMUNICATION SYSTEM, NON-TRANSITORY COMPUTER-READABLE MEDIUM FOR TERMINAL, AND COMMUNICATION APPARATUS

CROSS-REFERENCE TO RELATED APPLICATION

This application claims priority from Japanese Patent Application No. 2021-029849 filed on Feb. 26, 2021, the content of which is incorporated herein by reference in its entirety.

TECHNICAL FIELD

The present disclosure relates to a technique for establishing a wireless connection between a pair of devices in accordance with a predetermined communication protocol.

BACKGROUND

Wi-Fi Easy Connect Specification Version 2.0, Wi-Fi Alliance, 2020 describes Device Provisioning Protocol (hereafter, DPP), which is a wireless communication protocol defined by Wi-Fi Alliance. A method under DPP uses a code image resulting from coding of a public key of a first device and allows a second device to read the code image and obtain the public key. The second device communicates with the first device using the public key to establish a Wi-Fi connection between the first device and an access point.

SUMMARY

A code image for a public key with more characters is likely to increase in size. A technique described herein uses a code image that is less likely to increase in size.

A communication system according to an aspect of the disclosure may include a communication apparatus, a terminal, and a server. The terminal may include a camera, a wireless interface that performs wireless communication in accordance with a predetermined communication protocol of a Wi-Fi specification, a display, a computer, and a terminal memory storing a code image reading program unprovided by a vendor of the communication apparatus and a browser program unprovided by the vendor. The code image reading program may cause the computer to: obtain a character string by decoding a code image in response to the camera reading the code image, the character string including a specific uniform resource identifier without including a public key of the communication apparatus, the specific uniform resource identifier allowing a vendor program provided by the vendor to be downloaded and including identification information identifying the communication apparatus; and provide the obtained character string to the browser program. The browser program causes the computer to: receive, in response to the character string being obtained from the code image reading program, specific web page data usable to display a specific web page from the server using the specific uniform resource identifier included in the character string, the specific web page allowing the vendor program to be downloaded; and cause the display to display the specific web page using the specific web page data. The vendor program downloaded in response to the display displaying the specific web page causes the computer to: obtain the character string by decoding the code image in response to the camera re-reading the code image; obtain the public key of the communication apparatus using the identification information in the specific uniform resource identifier included in the obtained character string; and perform a predetermined process to perform target communication in accordance with the predetermined communication protocol with the communication apparatus through the wireless interface using the obtained public key to establish a wireless connection in accordance with the predetermined communication protocol between a pair of devices.

The above configuration uses a code image including a coded character string without including a public key of a communication apparatus. The code image is thus less likely to increase in size. The character string includes a specific uniform resource identifier (URI) including identification information for identifying a communication apparatus. A terminal can obtain a vendor program using the specific URI and obtain a public key of the communication apparatus using the identification information.

A computer program according to another aspect of the disclosure is a computer program for a terminal including a camera, a wireless interface that performs wireless communication in accordance with a predetermined communication protocol of a Wi-Fi specification, a display, and a computer. The computer program causes the computer to: obtain a character string by decoding a code image in response to the camera reading the code image, the character string including identification information without including a public key of the communication apparatus, the identification information identifying a communication apparatus; obtain the public key of the communication apparatus using the identification information included in the obtained character string; and perform a predetermined process to perform target communication in accordance with the predetermined communication protocol with the communication apparatus through the wireless interface using the obtained public key to establish a wireless connection in accordance with the predetermined communication protocol between a pair of devices.

A communication apparatus according to another aspect of the disclosure may include a wireless interface, a housing, and a controller. The wireless interface performs wireless communication in accordance with a predetermined communication protocol of a Wi-Fi specification. The housing has a seal indicating a code image obtained by coding a character string. The character string includes identification information without including a public key of the communication apparatus. The identification information identifies the communication apparatus and is usable by a terminal to obtain the public key. The controller is configured to perform, in response to the public key being obtained by the terminal, target communication in accordance with the predetermined communication protocol with the terminal through the wireless interface to establish a wireless connection in accordance with the predetermined communication protocol between a pair of devices.

A communication apparatus according to another aspect of the disclosure may include a wireless interface, and a controller. The wireless interface performs wireless communication in accordance with a predetermined communication protocol of a Wi-Fi specification. The controller is configured to cause an output unit to output a code image obtained by coding a character string including identification information without including a public key of the communication apparatus. The identification information identifies the communication apparatus and is usable by a terminal to obtain the public key. The controller is configured to perform, in response to the public key being obtained by the terminal, target communication in accordance with the predetermined communication protocol with the terminal through the wireless interface to establish a wireless connection in accordance with the predetermined communication protocol between a pair of devices.

The computer program for a terminal and the communication apparatus according to the above aspects each use a code image including a coded character string without including a public key of a communication apparatus. The code image is thus less likely to increase in size. The character string includes identification information for identifying a communication apparatus. The terminal can obtain the public key of the communication apparatus using the identification information.

The above terminal and a method implementable by the terminal are also novel and useful. A computer-readable recording medium storing a computer program for the terminal is also novel and useful. A method implementable by each of the communication apparatus, a computer program for each of the communication apparatus, and a computer-readable recording medium storing the computer program are also novel and useful.

BRIEF DESCRIPTION I/F THE DRAWINGS

FIG. 3 is a schematic sequence diagram of a process for establishing a Wi-Fi connection between a printer and an access point.

FIG. 4 is a sequence diagram of Bootstrapping in a first embodiment.

FIG. 5 is a sequence diagram of Bootstrapping continuous from FIG. 4.

FIG. 6 is a sequence diagram of Bootstrapping in a second embodiment.

DETAILED DESCRIPTION

First Embodiment

Figure 1:
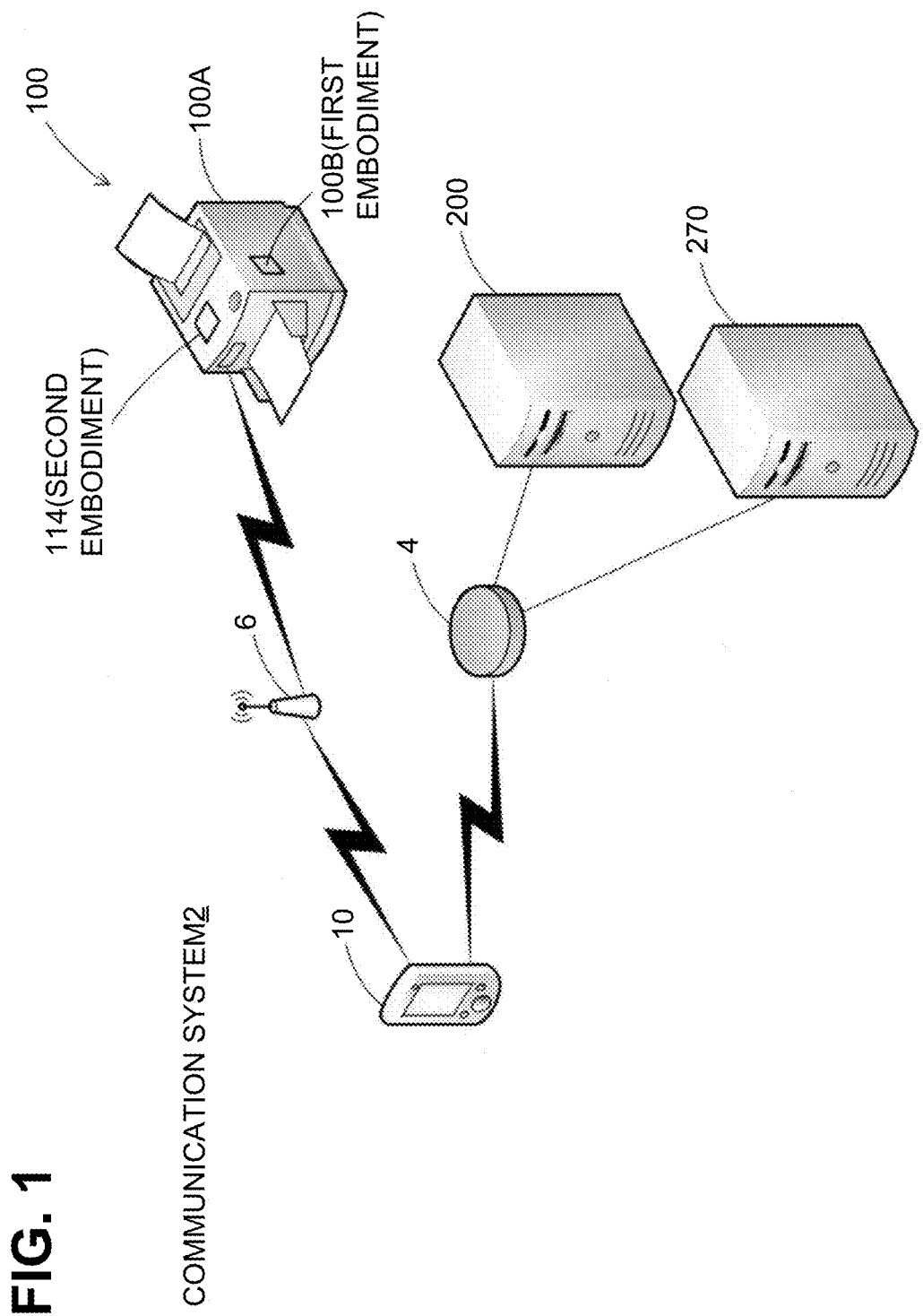
FIG. 1 is a schematic diagram of a communication system.

Configuration of Communication System 2: FIG. 1

As shown in FIG. 1, a communication system 2 includes an access point (hereafter, AP) 6, a terminal 10, a printer 100, and servers 200 and 270. In the present embodiment, a user establishes a wireless connection (hereafter, a Wi-Fi connection) between the printer 100 and the AP 6 in accordance with the Wi-Fi specification using the terminal 10.

Figure 2:
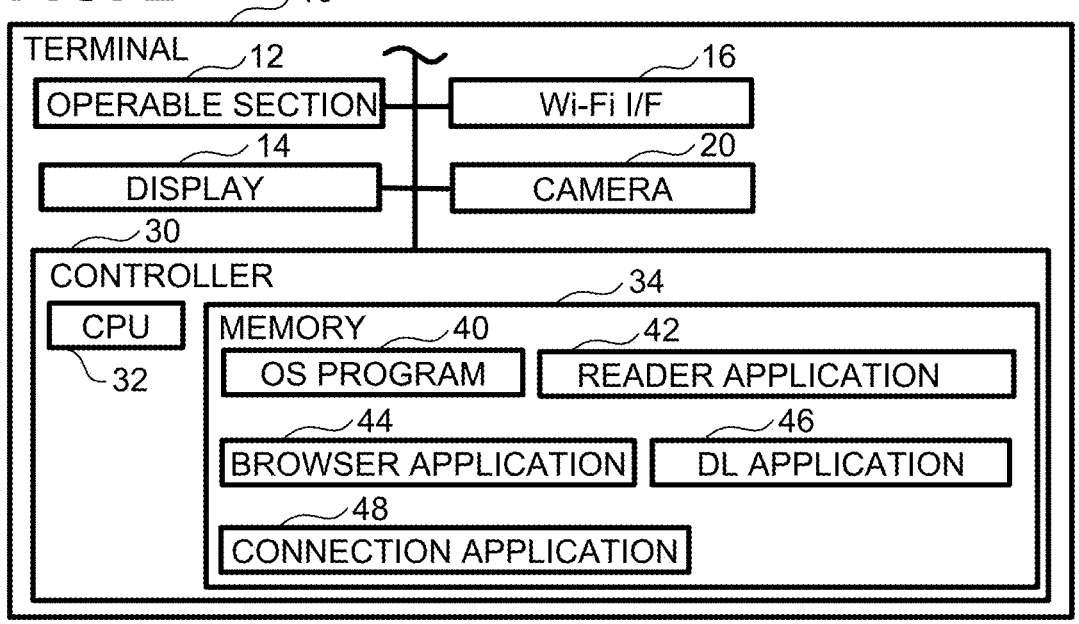
FIG. 2 is a block diagram of devices showing their control configuration.
Figure 2:
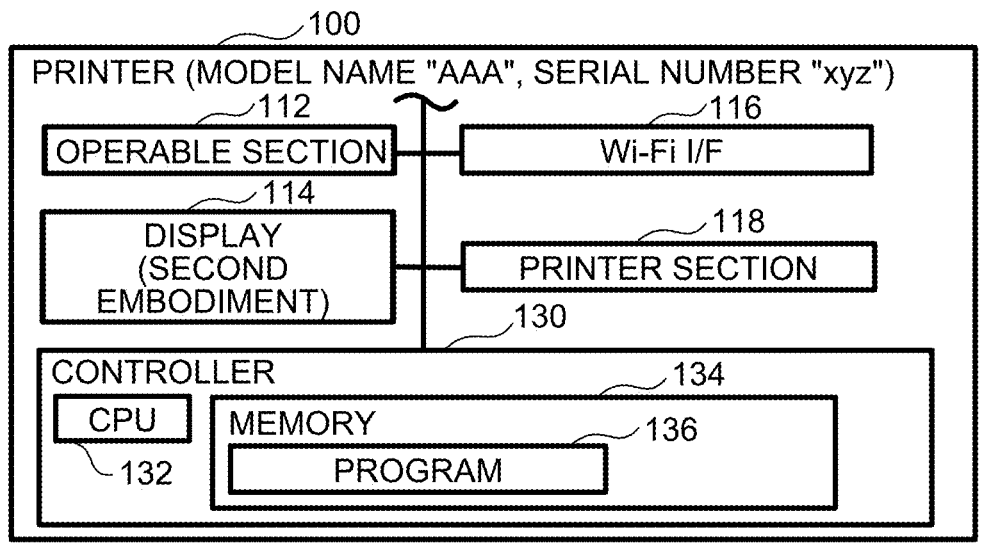
Figure 2:
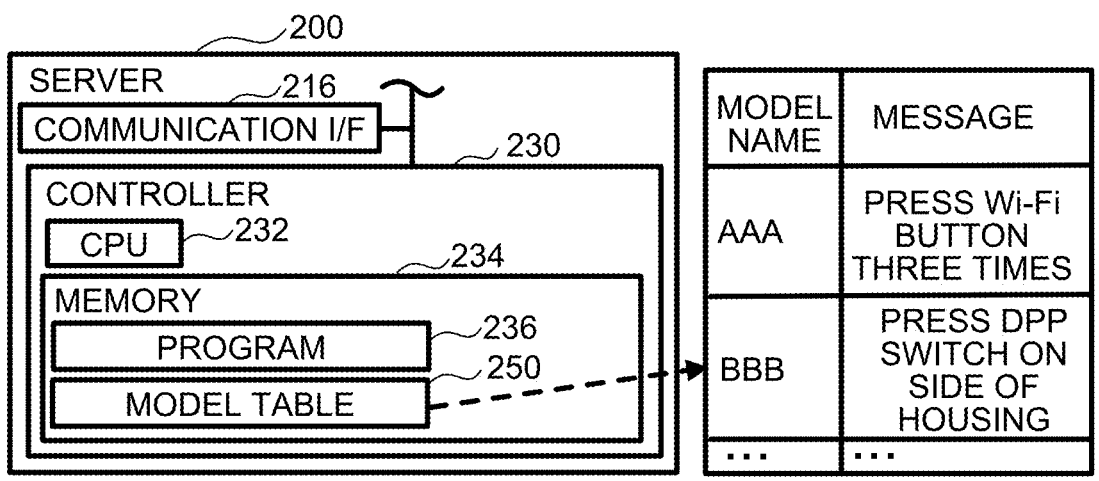

Configuration of Terminal 10: FIG. 2

The terminal 10 is a portable terminal such as a mobile phone (e.g., a smartphone), a personal digital assistant (PDA), or a tablet personal computer (PC). In a modification, the terminal 10 may be a stationary terminal. As shown in FIG. 2, the terminal 10 includes an operable section 12, a display 14, a Wi-Fi interface 16, a camera 20, and a controller 30, which are connected to a bus (with no reference sign). The interface is hereafter referred to as the I/F.

The operable section 12 includes multiple buttons. A user can operate the operable section 12 to input various instructions into the terminal 10. The display 14 displays various items of information. The display 14 also functions as a touchscreen (or an operable section). The camera 20 is a device for photographing an object. In the present embodiment, the camera 20 is used to photograph a QR code (registered trademark) for the printer 100.

The Wi-Fi I/F 16 is a wireless interface for performing wireless communication in accordance with the Wi-Fi specification. The Wi-Fi specification specifies wireless communication in accordance with, for example, 802.11 of the Institute of Electrical and Electronics Engineers, Inc. (IEEE) and similar specifications modeled after IEEE 802.11 (e.g., 802.11a, .11b, .11g, or .11n). The terminal 10 can establish a Wi-Fi connection with the AP 6 through the Wi-Fi I/F 16 using a password and a service set identifier (SSID) of a wireless network formed with the AP 6.

The Wi-Fi I/F 16 supports Device Provisioning Protocol (DPP) defined by Wi-Fi Alliance. DPP is described in Wi-Fi Easy Connect Specification Version 2.0 prepared by Wi-Fi Alliance to easily establish a Wi-Fi connection between a pair of devices (e.g., the printer 100 and the AP 6) using the terminal 10. This specification is hereafter referred to as the DPP specification.

The controller 30 includes a central processing unit (CPU) 32 and a memory 34. The CPU 32 performs various processes in accordance with a program 40 and applications 42, 44, 46, and 48 stored in the memory 34. The memory 34 includes, for example, a volatile memory and a nonvolatile memory. The memory 34 stores the operating system (OS) program 40 and the applications 42 to 48. The OS program 40 is hereafter referred to as the OS 40.

The OS 40 is a program for performing the basic operations of the terminal 10. The OS 40 is Android (registered trademark) in the present embodiment. In a modification, the OS 40 may be another OS (e.g., iOS). The OS 40 is prestored in the terminal 10 at the shipment of the terminal 10.

The reader application 42 is a program for reading a QR code. The browser application 44 is a program for displaying a web page. The download (DL) application 46 is a program for accessing a server 270 serving as an application store and downloading an application. The connection application 48 is a program for performing wireless communication in accordance with DPP to establish a Wi-Fi connection between the printer 100 and the AP 6. The applications 42 to 48 are standard applications used under the OS 40 and are prestored in the terminal 10 at the shipment of the terminal 10. More specifically, the applications 42 to 48 are programs unprovided by a vendor of the printer 100. In a modification, the terminal 10 may include a universal application instead of the connection application 48.

In the processes described later, a printer application 50 is installed in the terminal 10. The printer application 50 is a program for causing the connection application 48 to perform wireless communication in accordance with DPP and for causing the printer 100 to perform printing. The printer application 50 is provided by the vendor of the printer 100 and is installed in the terminal 10 after the shipment of the terminal 10.

Configuration of Printer 100: FIGS. 1 and 2

The printer 100 is a peripheral (e.g., a peripheral for the terminal 10) that can perform printing. The printer 100 has the model name "AAA" and the serial number "xyz". As shown in FIG. 1, the printer 100 includes a housing 100A, to which a seal 100B indicating a QR code is attached. The QR code is information obtained by coding a character string including a uniform resource identifier (URI). The URI includes a domain of a server 200 and the serial number "xyz" of the printer 100.

As shown in FIG. 2, the printer 100 includes an operable section 112, a Wi-Fi I/F 116, a printer section 118, and a controller 130, which are connected to a bus (with no reference sign). The printer 100 in the present embodiment includes no display that can display a QR code. This includes the printer 100 with no display and the printer 100 with a very small display.

The operable section 112 includes multiple buttons. A user can operate the operable section 112 to input various instructions into the printer 100. The Wi-Fi I/F 116 supports DPP. The printer section 118 performs printing such as inkjet printing or laser printing. The controller 130 includes a CPU 132 and a memory 134. The CPU 132 performs various processes in accordance with a program 136 stored in the memory 134. The memory 134 includes, for example, a volatile memory and a nonvolatile memory.

Configuration of Server 200: FIG. 2

The server 200 is a web server. The server 200 is installed on the Internet 4 (refer to FIG. 1) by the vendor of the printer 100. The server 200 includes a communication I/F 216 and a controller 230, which are connected to a bus (with no reference sign). The communication I/F 216 is connected to the Internet 4. The controller 230 includes a CPU 232 and a memory 234. The CPU 232 performs various processes in accordance with a program 236 stored in the memory 234. The memory 234 includes, for example, a volatile memory and a nonvolatile memory.

The memory 234 also stores a model table 250. The model table 250 associates the model name of each of different printers with a message indicating a change operation performed to change the state of the printer with the model name from a DPPOFF state to a DPPON state. The wireless communication in accordance with DPP is disabled in the DPPOFF state and is enabled in the DPPON state.

Overview of DPP: FIG. 3

An overview of DPP will now be described with reference to FIG. 3. An operation performed by a CPU (e.g., CPU 32) of each device (e.g., terminal 10) is hereafter referred to as an operation performed by a device for ease of understanding. The communication is performed through the I/Fs 16, 116, and 216 (refer to FIG. 2), although hereafter not being specified as being through the I/Fs.

In the present embodiment, the AP 6 does not support DPP. The AP 6 operates as a primary station of a wireless network using the SSID "sss" and the password "ttt". For example, the user of the terminal 10 inputs the SSID "sss" and the password "ttt" into the terminal 10 by operating the operable section 12. In this case, the terminal 10 establishes a Wi-Fi connection with the AP 6 using the OS 40. FIG. 3 shows an example of a Wi-Fi connection occurring between the terminal 10 and the AP 6. For the printer 100 to perform printing, the user of the terminal 10 establishes a Wi-Fi connection between the printer 100 and the AP 6 to cause the terminal 10 and the printer 100 to perform communication through the AP 6. This is achieved by the processing described below.

In T25, the terminal 10 performs, in cooperation with the printer 100, Bootstrapping (hereafter, BS) defined in the DPP specification. BS is a process of providing, from the printer 100 to the terminal 10, a public key of the printer 100 to be used in Authentication (hereafter, Auth) defined in the DPP specification in response to the terminal 10 photographing a QR code indicated by the seal 100B (refer to FIG. 1) attached to the printer 100.

In T30, the terminal 10, in cooperation with the printer 100, performs Auth using the public key obtained in BS in T25. Auth is a process performed by the terminal 10 and the printer 100 to authenticate each other as communication partners. More specifically, the terminal 10 transmits an Auth request using the public key to the printer 100 and receives an Auth response from the printer 100.

In T35, the terminal 10 performs, in cooperation with the printer 100, Configuration (hereafter, Config) defined in the DPP specification. Config is a process of transmitting, to the printer 100, information for establishing a Wi-Fi connection between the printer 100 and the AP 6. More specifically, the terminal 10 generates a signed connector (hereafter, SC) and transmits the SC to the printer 100. The SC includes the SSID "sss" and the password "ttt" of the AP 6.

In T40, the printer 100 establishes a Wi-Fi connection with the AP 6 using the SSID "sss" and the password "ttt" included in the SC obtained in T35. More specifically, the printer 100 first transmits a Probe request by broadcasting and receives one or more Probe responses from one or more APs including the AP 6 located around the printer 100. In this case, the printer 100 determines that the Probe response (s) received from the AP(s) includes a Probe response including the SSID "sss" (specifically, the SSID "sss" of the AP 6) included in the obtained SC. The printer 100 then performs various communication operations such as Association or 4 way-handshake with the AP 6 to establish a Wi-Fi connection with the AP 6. During such various communication operations, the printer 100 transmits, to the AP 6, authentication information using the password "ttt" included in the obtained SC, and the AP 6 performs authentication of the password "ttt". When the authentication is successful, a Wi-Fi connection occurs between the printer 100 and the AP 6.

Through these processes, the terminal 10 and the printer 100 are connected to the same wireless network formed with the AP 6 as secondary stations. The terminal 10 can thus transmit, for example, print data representing an image to be printed to the printer 100 through the AP 6. The printer 100 can thus print the image represented with the print data.

In DPP, the user does not input the SSID "sss" and the password "ttt" of the AP 6 into the printer 100 to establish a Wi-Fi connection between the printer 100 and the AP 6. The user can thus easily establish a Wi-Fi connection between the printer 100 and the AP 6.

Details of BS: FIGS. 4 and 5

BS in T25 in FIG. 3 will be described in detail with reference to FIGS. 4 and 5. A QR code indicated by the seal 100B on the printer 100 is a coded character string 300. The character string 300 includes the URI: https://www.server-.com/xyz. The URI includes the domain: www.server.com of the server 200 and the serial number "xyz" of the printer 100. The character string 300 does not include the public key of the printer 100.

Upon receiving an operation of activating the reader application 42 performed by the user in T100, the terminal 10 performs the processing in T102 to T106 below in accordance with the reader application 42. Upon receiving an operation of photographing the QR code indicated by the seal 100B performed by the user in T102, the terminal 10 photographs the QR code with the camera 20. In T104, the terminal 10 decodes the QR code to obtain the character string 300. In T106, the terminal 10 (specifically, reader application 42) provides the character string 300 to the browser application 44.

The terminal 10 performs the processing in T110 to T116 below in accordance with the browser application 44. In T110, the terminal 10 transmits, to the server 200, a web page request including the URI indicated by the character string 300 as a destination. In T112, the terminal 10 receives web page data representing a web page 400 from the server 200. In T114, the terminal 10 displays the web page 400. The web page 400 includes a download button and a message indicating that the printer application 50 is to be downloaded. Upon receiving an operation on the download button on the web page 400 in T116, the terminal 10 (specifically, browser application 44) provides an application identifier that identifies the printer application 50 to the DL application 46 in T118.

The terminal 10 performs the processing in T120 to T132 below in accordance with the DL application 46. In T120, the terminal 10 transmits a web page request including the application identifier to the server 270. In T122, the terminal 10 receives web page data representing a web page 410 from the server 270. In T124, the terminal 10 displays the web page 410. The web page 410 includes the name of the printer application 50 and the download button.

Upon receiving an operation on the download button on the web page 410 in T126, the terminal 10 transmits a download request including the application identifier to the server 270 in T130. The terminal 10 receives (downloads) the printer application 50 from the server 270 in T132. The printer application 50 is thus installed in the terminal 10.

As shown in FIG. 5, upon receiving an operation of activating the printer application 50 performed by the user in T150, the terminal 10 performs the processing in T152 to T160, T166 and T170, and T200 to T222 below in accordance with the printer application 50.

In T152, upon receiving an operation of photographing the QR code indicated by the seal 100B performed by the user, the terminal 10 photographs the QR code with the camera 20. In T154, the terminal 10 decodes the QR code and obtains the character string 300. In other words, the terminal 10 obtains the character string 300 again.

In T156, the terminal 10 generates a URI 330. More specifically, the terminal 10 first specifies the serial number "xyz" of the printer 100 from the character string 300. The terminal 10 then generates the URI 330 including the domain: www.server.com of the server 200 prestored in the printer application 50, the character string manual prestored in the printer application 50, and the specified serial number "xyz". In this case, the character string manual corresponds to the web page indicating an operation change for changing the state of the printer 100 from the DPPOFF state to the DPPON state. The terminal 10 generates the URI 330. The printer 100 may not include the QR code indicating the URI 330. The QR code of the printer 100 is thus less likely to increase in size. To change the URI in the server 200 (e.g., to change the character string manual to another character string), the vendor of the printer 100 can appropriately cause the terminal 10 to generate a new URI by updating the printer application 50.

In the subsequent process in T160, the terminal 10 transmits, to the server 200, a web page request including the generated URI 330 as a destination. In this case, the terminal 10 transmits the web page request and displays a web page (described later) using the printer application 50 without using the browser application 44. In this configuration, the terminal 10 may not perform a process of activating the browser application 44. In other words, the terminal 10 may not display a window different from the window displayed by the printer application 50 (specifically, may not display a window displayed by the browser application 44). This configuration is less likely to increase the processing load on the terminal 10 and also saves the user from viewing multiple windows.

Upon receiving a web page request from the terminal 10 in T160, the server 200 first specifies the serial number "xyz" in the URI 330 included in the web page request in T162. The server 200 includes a serial number table (not shown). The table stores the serial number of each of multiple printers associated with the model name of the printer. In T162, the server 200 can specify the model name "AAA" of the printer 100 using the serial number "xyz" with reference to the table. In a modification, the serial number "xyz" may include a character string indicating the model name "AAA". In this case, the server 200 can specify the model name "AAA" using the serial number "xyz" without referring to the serial number table.

In the subsequent process in T164, the server 200 extracts, from the model table 250 (refer to FIG. 2) in the memory 234, the message "Press Wi-Fi button three times" for the model name "AAA" specified in T162. The server 200 then generates web page data representing a web page including the extracted message, a predetermined message, and a start button. The predetermined message indicates that the start button is to be pressed after the operation instructed by the extracted message is performed. The start button is used to cause the terminal 10 to start Auth. The server 200 then transmits the generated web page data to the terminal 10 in T166.

Upon receiving the web page data from the server 200 in T166, the terminal 10 displays a web page 420 represented by the web page data on the display 14 in T170. The web page 420 includes the extracted message, the predetermined message, and the start button.

In T180, in accordance with the message in the web page 420, the user presses a Wi-Fi button (not shown) included in the operable section 112 in the printer 100 three times. In this case, the printer 100 switches from the DPPOFF state to the DPPON state in T182. More specifically, the printer 100 (specifically, CPU 132) provides, to the Wi-Fi I/F 116, an instruction of switching from the DPPOFF state to the DPPON state. The printer 100 is enabled to perform communication in accordance with DPP (e.g., to receive an Auth request or to transmit an Auth response). In other words, the web page 420 is an operation screen displaying a change operation to change the state of the printer 100 from the DPPOFF state to the DPPON state.

In the present embodiment as described above, the web page 420 includes a message for changing the state of the printer 100 having the model name "AAA" to the DPPON state. Thus, the user can easily change the state of the printer 100 to the DPPON state. When the printer 100 is maintained in the DPPOFF state, the printer 100 does not transmit the Auth response to the terminal 10. In this case, Auth is unsuccessful, and a Wi-Fi connection does not occur between the printer 100 and the AP 6.

In the subsequent process in T190, the user performs an operation of selecting the start button on the web page 420. In this case, the terminal 10 generates a URI 340 in T200. More specifically, the terminal 10 generates a URI 340 including the domain: www.server.com of the server 200 prestored in the printer application 50, the character string: key prestored in the printer application 50, and the serial number "xyz" of the printer 100. The character string: key requests generation of the public key of the printer 100. The terminal 10 generates the URI 340. The printer 100 thus may not include a QR code including the URI 340. The QR code of the printer 100 is thus less likely to increase in size. To change the URI in the server 200 (e.g., to change the character string: key to another character string), the vendor of the printer 100 can appropriately cause the terminal 10 to generate a new URI by updating the printer application 50. In the subsequent process in T210, the terminal 10 transmits, to the server 200, a public key request including the generated URI 340 as a destination.

Upon receiving the public key request from the terminal 10 in T210, the server 200 generates a public key 350 in T212. More specifically, the server 200 first specifies the serial number "xyz" in the URI 340 included in the public key request. Subsequently, the server 200 generates the public key 350 by performing a predetermined calculation of the specified serial number "xyz". The server 200 then transmits the public key 350 to the terminal 10 in T214.

The terminal 10 receives the public key 350 from the server 200 in T214. The terminal 10 (specifically, printer application 50) thus causes the server 200 to generate the public key 350 instead of generating the public key 350 in the terminal 10. The printer application 50 thus may not include a program for generating the public key 350.

The terminal 10 then generates BS information including the public key 350 in T220. The BS information is defined in accordance with Bootstrapping Information Format defined in the DPP specification. More specifically, the BS information includes an identifier K in accordance with Augmented Backus-Naur Form (ABNF), and a character string of the public key 350 associated with the identifier K. The identifier K indicates that the character string associated with the identifier K is the public key 350 of the printer 100. The terminal 10 (specifically, printer application 50) provides the generated BS information to the connection application 48 in T222.

The terminal 10 performs processing in T230 below in accordance with the connection application 48. More specifically, the terminal 10 specifies the public key 350 using the BS information in T230. The BS information is defined in accordance with Bootstrapping Information Format defined in the DPP specification. The connection application 48 can thus appropriately specify the character string associated with the identifier K as the public key 350.

The terminal 10 (specifically, connection application 48) then performs processing in T30 and T35 in FIG. 3. More specifically, the terminal 10 transmits, to the printer 100, an Auth request using the specified public key 350 in T230. In other words, the terminal 10 does not transmit the Auth request to the printer 100 until the start button on the web page 420 is operated. This configuration can avoid the Auth request being transmitted from the terminal 10 to the printer 100 while the printer 100 is in the DPPOFF state.

Upon receiving the Auth request from the terminal 10, the printer 100 performs the same calculation using its serial number "xyz" as performed by the server 200 in T212 to generate the public key 350. The public key 350 is shared between the terminal 10 and the printer 100. The printer 100 authenticates the Auth request received from the terminal 10 using the public key 350. When the authentication is successful, the printer 100 transmits the Auth response to the terminal 10.

As described with reference to FIG. 3, in response to the Auth request transmitted to the printer 100, the terminal 10 (specifically, connection application 48) receives the Auth response from the printer 100 (refer to T30 in FIG. 3) and then transmits the SC to the printer 100 (refer to T35). Thus, the terminal 10 can establish a Wi-Fi connection between the printer 100 and the AP 6 (refer to T40).

Effects of Present Embodiment

In the above configuration, the QR code indicated by the seal 100B is a coded character string 300 without including the public key 350 of the printer 100. The QR code is thus less likely to increase in size. The characters in the URI are normally fewer than the characters in the public key. Thus, the QR code indicating the URI as used in the present embodiment is smaller than the QR code indicating the public key. In particular, the character string 300 includes the URI, which includes the serial number "xyz" of the printer 100. The terminal 10 can obtain the printer application 50 using the URI (T110 to T132 in FIG. 4) and obtain the public key 350 of the printer 100 using the serial number "xyz" (T200 to T230 in FIG. 5).

Correspondence

The printer 100, the server 200, and the server 270 are respectively examples of a communication apparatus, a server, and a different server. The printer 100 and the AP 6 are examples of a pair of devices. The printer application 50 is an example of a vendor program and a computer program. The URI included in the character string 300 is an example of a specific URI. The URIs 330 and 340 are respectively examples of a first URI and a second URI. The web page data in T112 and the web page 400 in FIG. 4 are respectively examples of specific web page data and a specific web page. The web page data in T166 and the web page 420 in FIG. 5 are respectively examples of first web page data and a first web page. The web page data in T122 and the web page 410 in FIG. 4 are respectively examples of second web page data and a second web page. The operations in T116 and T126 in FIG. 4 are respectively examples of a first operation and a second operation. The DPPOFF state and the DPPON state are respectively examples of a disabled state and an enabled state. The message in the web page 420 is an example of a specific message. The serial number "xyz" is an example of identification information. The processing in T156, T160, T166, and T170 in FIG. 5 is an example of a display process. The processing in T220 and T222 is an example of a predetermined process. The processing in T30 and T35 in FIG. 3 is an example of target communication. The Auth request and the Auth response are respectively examples of an authentication request and an authentication response. The SC is an example of connection information.

Second Embodiment: FIG. 6

A second embodiment will now be described. The components and processes that are the same as in the first embodiment will not be described. In the present embodiment, no seal 100B is attached to the housing 100A in the printer 100. The printer 100 includes a display 114 (refer to FIGS. 1 and 2) that can display a QR code. The server 200 does not include the model table 250 (refer to FIG. 2).

In the present embodiment, instead of BS in FIGS. 4 and 5, BS in FIG. 6 is performed. The user performs a DPP activation operation of the printer 100 in T300. The operation may be, for example, selecting a DPP button in the operable section 112 or selecting a DPP button in a setting screen appearing on the display 114. Upon receiving the operation, the printer 100 switches from the DPPOFF state to the DPPON state in T302.

In the subsequent process in T304, the printer 100 generates a QR code and causes the display 114 to display the QR code. The QR code is a coded character string 300 (refer to FIG. 4) as in the first embodiment.

The same processes as in T100 to T132 in FIG. 4 are then performed. In other words, the terminal 10 reads the QR code appearing on the printer 100 in T102. The processing in T310 to T314 is the same as the processing in T150 to T154 in FIG. 5. With the printer 100 switched to the DPPON state in T302, the terminal 10 does not perform the processing in T156 to T190 in FIG. 5. The processing in T320 to T450 is the same as the processing in T200 to T230 in FIG. 5.

Effects of Present Embodiment

In the present embodiment as well, the QR code appearing on the printer 100 is a coded character string 300 without including the public key 350 of the printer 100. The QR code is thus less likely to increase in size. The printer 100 can appropriately display the QR code on the display 114 that is not relatively large. In the present embodiment, the processing in T304 is an example of a process performed by an output controller.

Although specific examples of the techniques are described herein in detail, these are mere examples and do not limit the scope of the claims. The techniques described in the scope of the claims include various modifications and changes of the specific examples described above. Such modifications will be described below.

First Modification

In the example shown in FIG. 3, the terminal 10 establishes a Wi-Fi connection with the AP 6 using the SSID "sss" and the password "ttt" of the AP 6. In some embodiments, the terminal 10 may establish a Wi-Fi connection with the AP 6 by wirelessly communicating with DPP. In other words, the AP 6 supports DPP and includes a QR code indicating the public key of the AP 6 (e.g., a seal is attached to the housing of the AP 6). The terminal 10 obtains the public key of the AP 6 by photographing the QR code (specifically, performing BS). The terminal 10 then performs Auth and Config in cooperation with the AP 6. In Config, the terminal 10 generates an SC for an AP and transmits the AP SC to the AP 6. The terminal 10 and the AP 6 then share a connection key by performing Network Access (hereafter, NA) using the AP SC and establish a Wi-Fi connection using the connection key. The terminal 10 then performs BS, Auth, and Config (T25 to T35) in cooperation with the printer 100. In Config, the terminal 10 generates an SC for a printer without including the SSID and the password of the AP 6 and transmits the printer SC to the printer 100. In this case, the printer 100 and the AP 6 share the connection key by performing NA using the printer SC and the AP SC and establish a Wi-Fi connection using the connection key. In the present modification, the printer SC is an example of connection information.

Second Modification

A Wi-Fi connection may occur between the terminal 10 and the printer 100, instead of occurring between the terminal 10 and the AP 6. In this case, the terminal 10 performs the processing in T25 to T35 in FIG. 3 and transmits the printer SC to the printer 100 in T35. The terminal 10 and the printer 100 share the connection key by performing NA using the printer SC and establish a Wi-Fi connection using the connection key. In the present modification, the printer SC is an example of connection information. The terminal 10 and the printer 100 are examples of a pair of devices.

Third Modification

A Wi-Fi connection may occur between the printer 100 and the AP 6, instead of occurring between the terminal 10 and the AP 6. In this case, the printer 100 performs the processing in T25 to T35 in FIG. 3 and receives an SC for an AP from the AP 6 in T35. The printer 100 and the AP 6 share the connection key by performing NA using the AP SC and establish a Wi-Fi connection using the connection key. In the present modification, the printer 100 and the AP 6 are examples of a pair of devices. As in the present modification, the target communication may include reception of connection information from a communication apparatus.

Fourth Modification

The identification information may be, for example, a media access control (MAC) address or the model name of the printer 100, instead of being the serial number "xyz".

Fifth Modification

The terminal 10 may not include the connection application 48. In this case, the printer application 50 does not perform the processing in T220 and T222 in FIG. 5. The printer application 50 performs communication in T30 and T35 in FIG. 3 using the public key 350. In the present modification, performing communication in T30 and T35 using the public key 350 is an example of a predetermined process.

Sixth Modification

The web page data in T112 and T122 in FIG. 4 and T166 in FIG. 5 may be data including, for example, a character string or an image forming the web page, instead of data representing the web page. In this case, the terminal 10 generates the web page using the web page data.

Seventh Modification

The printer application 50 may provide the URI 330 generated in T156 in FIG. 5 to the browser application 44. In this case, the browser application 44 can perform the processing in T160, T166, and T170. In the present modification, the process of providing the URI 330 to the browser application 44 is an example of a display process.

Eighth Modification

The processing in T156 to T170 in FIG. 5 may be eliminated.

Ninth Modification

The processing in T100 to T132 in FIG. 4 may be eliminated. In the present modification, the character string 300 may not include the URI. In other words, the character string 300 may include the serial number "xyz" of the printer 100 alone. In this case, the QR code can decrease in size.

Tenth Modification

The character string 300 may include the URI used in T110 in FIG. 4, the URI 330 used in T160 in FIG. 5, and the URI 340 used in T210. In this case, the terminal 10 can transmit the web page request including the URI 330 to the server 200 in T160 without performing the processing in T156. The terminal 10 can also transmit the web page request including the URI 340 to the server 200 in T210 without performing the processing in T200. In the second embodiment (specifically, FIG. 6), the user may be allowed to select whether to display, on the printer 100, the QR code including the URI alone used in T110 in FIG. 4 or the QR code including the URI 340 alone used in T210 in FIG. 5. In this case, the terminal 10 may read the QR code including the URI alone in T102 in FIG. 4, and the QR code including the URI 340 alone in T312 in FIG. 6.

Eleventh Modification

The terminal 10 may generate the public key 350 using the serial number "xyz", instead of performing the processing in T200 to T214 in FIG. 5. In other words, the terminal may obtain a public key without receiving the public key from a server.

Twelfth Modification

The terminal 10 (specifically, browser application 44) may transmit a download request, instead of the web page request, to the server 200 in T110 in FIG. 4 and download the printer application 50 from the server 200. In the present modification, the processing in T112 to T132 is eliminated.

Thirteenth Modification

The server that provides the web page data in T112 in FIG. 4, the server that provides the web page data in T166 in FIG. 5, and the server that provides the public key 350 in T214 may be different from one another. In other words, a server may include one server 200 as in the above embodiment or may include multiple servers as in the present modification.

Fourteenth Modification

The terminal 10 and the printer 100 may support another protocol for establishing a Wi-Fi connection using a public key, an authentication request, and an authentication response, instead of supporting DPP. In other words, a predetermined communication protocol is not limited to DPP.

Fifteenth Modification

The communication apparatus may be another device such as a scanner, a multifunctional printer, a portable terminal, a PC, or a server, instead of being the printer 100.

Sixteenth Modification

In each of the above embodiments, the processes in FIGS. 3 to 6 are performed using software. In another modification, at least one of the processes shown in FIGS. 3 to 6 may be performed using hardware, such as a logic circuit.

The technical elements described herein or in the drawings each produce the technical effects separately or in combination, and combinations of the elements are not limited to those described in the claims as filed. The techniques illustrated herein or in the drawings may achieve multiple purposes at a time. Achieving one of the purposes may produce technical effects.

What is claimed is:
1. A communication system, comprising:
 a communication apparatus;
 a terminal; and
 a server,
the terminal including:
 a camera;
 a wireless interface configured to perform wireless communication in accordance with a predetermined communication protocol of a Wi-Fi specification;
 a display;
 a computer; and
 a terminal memory storing a code image reading program unprovided by a vendor of the communication apparatus and a browser program unprovided by the vendor,
wherein the code image reading program causes the computer to:
 obtain a character string by decoding a code image in response to the camera reading the code image, the character string including a specific uniform resource identifier without including a public key of the communication apparatus, the specific uniform resource identifier allowing a vendor program provided by the vendor to be downloaded and including identification information identifying the communication apparatus; and
 provide the obtained character string to the browser program,
the browser program causes the computer to:
 receive, in response to the character string being obtained from the code image reading program, specific web page data usable to display a specific web page from the server using the specific uniform resource identifier included in the character string, the specific web page allowing the vendor program to be downloaded; and
 cause the display to display the specific web page using the specific web page data, and
the vendor program downloaded in response to the display displaying the specific web page causes the computer to:
 obtain the character string by decoding the code image in response to the camera re-reading the code image;
 obtain the public key of the communication apparatus using the identification information in the specific uniform resource identifier included in the obtained character string; and
 perform a predetermined process to perform target communication in accordance with the predetermined communication protocol with the communication apparatus through the wireless interface using the obtained public key to establish a wireless connection in accordance with the predetermined communication protocol between a pair of devices.

2. The communication system according to claim 1, wherein
the vendor program further causes the computer to perform, using a first uniform resource identifier different from the specific uniform resource identifier, a display process including receiving first web page data usable to display a first web page from the server and causing the display to display the first web page, the first web page indicating a change operation to change a state of the communication apparatus from a disabled state in which wireless communication in accordance with the predetermined communication protocol is disabled to an enabled state in which the wireless communication in accordance with the predetermined communication protocol is enabled, and
in response to the change operation indicated by the first web page being performed on the communication apparatus, the target communication is performed with the communication apparatus in the enabled state to which the state of the communication apparatus is changed from the disabled state.

3. The communication system according to claim 2, wherein
the first uniform resource identifier includes the identification information in the specific uniform resource identifier included in the obtained character string,
the display process includes transmitting a web page request to the server using the first uniform resource identifier as a destination, and
the server includes:
a server memory storing a message indicating a change operation to change a state of each of a plurality of devices from the disabled state to the enabled state; and
a server controller configured to:
extract, in response to the web page request from the terminal, a specific message corresponding to the communication apparatus specified with the identification information included in the first uniform resource identifier from the server memory; and
transmit the first web page data including the extracted specific message to the terminal.

4. The communication system according to claim 1, wherein
the vendor program causes the terminal to:
transmit the identification information to the server using a second uniform resource identifier different from the specific uniform resource identifier as a destination; and
receive, from the server, the public key generated by the server based on the identification information to obtain the public key.

5. The communication system according to claim 1, wherein
the terminal memory further stores a download program unprovided by the vendor of the communication apparatus, and
the download program causes the computer to:
receive, in response to a first operation being performed on the specific web page to download the vendor program, second web page data usable to display a second web page from a different server other than the server, the second web page allowing the vendor program to be downloaded;
cause the display to display the second web page using the second web page data; and
download the vendor program in response to a second operation being performed on the second web page to download the vendor program.

6. The communication system according to claim 1, wherein
the terminal memory further stores a connection program unprovided by the vendor of the communication apparatus, and
the predetermined process includes providing the public key to the connection program to cause the connection program to perform the target communication with the communication apparatus.

7. A non-transitory computer readable medium having a computer program for a terminal including a camera, a wireless interface configured to perform wireless communication in accordance with a predetermined communication protocol of a Wi-Fi specification, a display, and a computer, the computer program causing the computer to:

obtain a character string by decoding a code image in response to the camera reading the code image, the character string including identification information without including a public key of a communication apparatus, the identification information identifying the communication apparatus;
obtain the public key of the communication apparatus using the identification information included in the obtained character string; and
perform a predetermined process to perform target communication in accordance with the predetermined communication protocol with the communication apparatus through the wireless interface using the obtained public key to establish a wireless connection in accordance with the predetermined communication protocol between a pair of devices.

8. The computer program according to claim 7, wherein the computer program further causes the computer to perform a display process using a first uniform resource identifier, the display process including receiving first web page data usable to display a first web page from a server and causing the display to display the first web page, the first web page indicating a change operation to change a state of the communication apparatus from a disabled state in which wireless communication in accordance with the predetermined communication protocol is disabled to an enabled state in which the wireless communication in accordance with the predetermined communication protocol is enabled, and
in response to the change operation indicated by the first web page being performed on the communication apparatus, the target communication is performed with the communication apparatus in the enabled state to which the state of the communication apparatus is changed from the disabled state.

9. The computer program according to claim 8, wherein the display process includes:
receiving the first web page data from the server without using a browser program included in the terminal; and
causing the display to display the first web page.

10. The computer program according to claim 8, wherein the first uniform resource identifier includes the identification information, and
the first web page data includes a specific message corresponding to the communication apparatus identified with the identification information.

11. The computer program according to claim 10, wherein the computer program further causes the computer to generate the first uniform resource identifier including the identification information and a domain of the server prestored in the computer program.

12. The computer program according to claim 8, wherein the computer program causing the computer to:
transmit the identification information to the server using a second uniform resource identifier as a destination; and
receive, from the server, the public key generated by the server based on the identification information to obtain the public key.

13. The computer program according to claim 12, wherein the computer program further causes the computer to generate the second uniform resource identifier including the identification information and a domain of the server prestored in the computer program.

14. The computer program according to claim 7, wherein the predetermined process includes providing the public key to a connection program included in the terminal to cause the connection program to perform the target communication with the communication apparatus.

15. The computer program according to claim 7, wherein the identification information includes a serial number of the communication apparatus.

16. The computer program according to claim 7, wherein the target communication includes:
- transmitting an authentication request using the public key to the communication apparatus;
- receiving an authentication response to the authentication request from the communication apparatus; and
- transmitting connection information to the communication apparatus; and the connection information includes information usable to establish the wireless connection in accordance with the predetermined communication protocol between the pair of devices including the communication apparatus and an access point.

17. A communication apparatus, comprising:
a wireless interface configured to perform wireless communication in accordance with a predetermined communication protocol of a Wi-Fi specification;
a housing having a seal indicating a code image obtained by coding a character string, the character string including identification information without including a public key of the communication apparatus, the identification information identifying the communication apparatus and being usable by a terminal to obtain the public key; and
a controller configured to perform, in response to the public key being obtained by the terminal, target communication in accordance with the predetermined communication protocol with the terminal through the wireless interface to establish a wireless connection in accordance with the predetermined communication protocol between a pair of devices.

18. A communication apparatus, comprising:
a wireless interface configured to perform wireless communication in accordance with a predetermined communication protocol of a Wi-Fi specification;
an controller configured to:
- cause an output unit to output a code image obtained by coding a character string including identification information without including a public key of the communication apparatus, the identification information identifying the communication apparatus and being usable by a terminal to obtain the public key; and
- perform, in response to the public key being obtained by the terminal, target communication in accordance with the predetermined communication protocol with the terminal through the wireless interface to establish a wireless connection in accordance with the predetermined communication protocol between a pair of devices.

19. The communication apparatus according to claim 17, wherein
the character string includes a specific uniform resource identifier allowing a vendor program provided by the vendor to be downloaded, and
the identification information is included in the specific uniform resource identifier.

20. The communication apparatus according to claim 17, wherein
the identification information includes a serial number of the communication apparatus.

21. The communication apparatus according to claim 17, wherein
the target communication includes:
- receiving an authentication request using the public key from the terminal;
- transmitting an authentication response to the authentication request to the terminal; and
- receiving connection information from the terminal, and the connection information includes information usable to establish the wireless connection in accordance with the predetermined communication protocol between the pair of devices including the communication apparatus and an access point.

22. The communication apparatus according to claim 18, wherein
the character string includes a specific uniform resource identifier allowing a vendor program provided by the vendor to be downloaded, and
the identification information is included in the specific uniform resource identifier.

23. The communication apparatus according to claim 18, wherein
the identification information includes a serial number of the communication apparatus.

24. The communication apparatus according to claim 18, wherein
the target communication includes:
- receiving an authentication request using the public key from the terminal;
- transmitting an authentication response to the authentication request to the terminal; and
- receiving connection information from the terminal, and the connection information includes information usable to establish the wireless connection in accordance with the predetermined communication protocol between the pair of devices including the communication apparatus and an access point.

* * * * *